United States Patent
Perego et al.

(10) Patent No.: US 7,442,846 B2
(45) Date of Patent: Oct. 28, 2008

(54) PROCESS FOR THE REGENERATION OF CATALYSTS FOR STEAM CRACKING

(75) Inventors: Carlo Perego, Carnate (IT); Paolo Pollesel, San Donato Milanese (IT); Massimo Soprani, Borgosesia (IT); Massimo Romagnoli, Sesto San Giovanni (IT)

(73) Assignees: Polimeri Europa S.p.A., Brindisi (IT); Enitecnologie S.p.A., San Donato Milanese (IT)

( * ) Notice: Subject to any disclaimer, the term of this patent is extended or adjusted under 35 U.S.C. 154(b) by 603 days.

(21) Appl. No.: 10/433,416

(22) PCT Filed: Nov. 21, 2001

(86) PCT No.: PCT/EP01/13622

§ 371 (c)(1),
(2), (4) Date: Nov. 17, 2003

(87) PCT Pub. No.: WO02/45850

PCT Pub. Date: Jun. 13, 2002

(65) Prior Publication Data

US 2004/0077913 A1     Apr. 22, 2004

(30) Foreign Application Priority Data

Dec. 6, 2000   (IT)  .......................... MI2000A2642

(51) Int. Cl.
*C07C 4/02*       (2006.01)
*C10G 11/02*      (2006.01)
*B01J 38/06*      (2006.01)

(52) U.S. Cl. ...................... 585/653; 585/651; 585/652; 208/122; 208/123; 208/130; 502/55; 502/56; 502/312; 502/322; 502/341; 423/600; 423/119

(58) Field of Classification Search .................. 502/55, 502/56, 341, 312, 322; 585/653, 651, 652; 208/122, 123, 130; 423/600, 119
See application file for complete search history.

(56) References Cited

U.S. PATENT DOCUMENTS

| 3,767,567 | A |   | 10/1973 | Kikuchi et al. |
| 3,969,542 | A |   | 7/1976  | Tomita et al. |
| 4,244,811 | A |   | 1/1981  | Grenoble et al. |
| 5,220,091 | A | * | 6/1993  | Brinkmeyer et al. ........ 585/660 |

FOREIGN PATENT DOCUMENTS

| DE | 243 647   | 3/1987 |
| EP | 0 323 784 | 7/1989 |

OTHER PUBLICATIONS

U.S. Appl. No. 09/614,168, filed Jul. 11, 2000, Amarilli, et al.

* cited by examiner

*Primary Examiner*—Glenn Caldarola
*Assistant Examiner*—In Suk Bullock
(74) *Attorney, Agent, or Firm*—Oblon, Spivak, McClelland, Maier & Neustadt, P.C.

(57) ABSTRACT

Process for the regeneration of exhausted catalysts, containing one or more calcium aluminates, for steam cracking reactions, comprising treating said exhausted catalysts in a stream of water vapour at a temperature ranging from 700 to 950° C., preferably from 720 to 850° C., and at a pressure ranging from 0.5 to 2 atm.

13 Claims, 6 Drawing Sheets

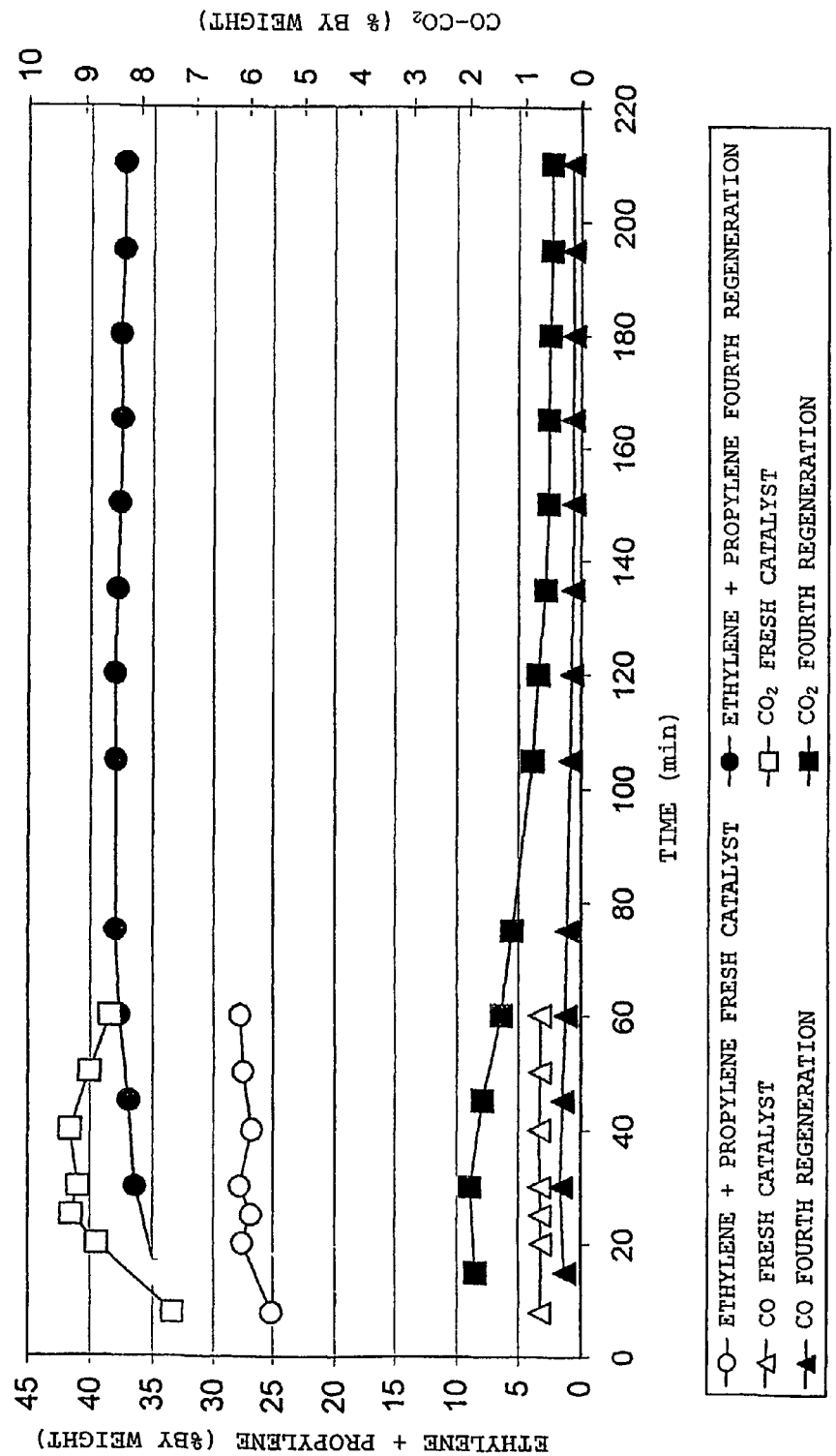

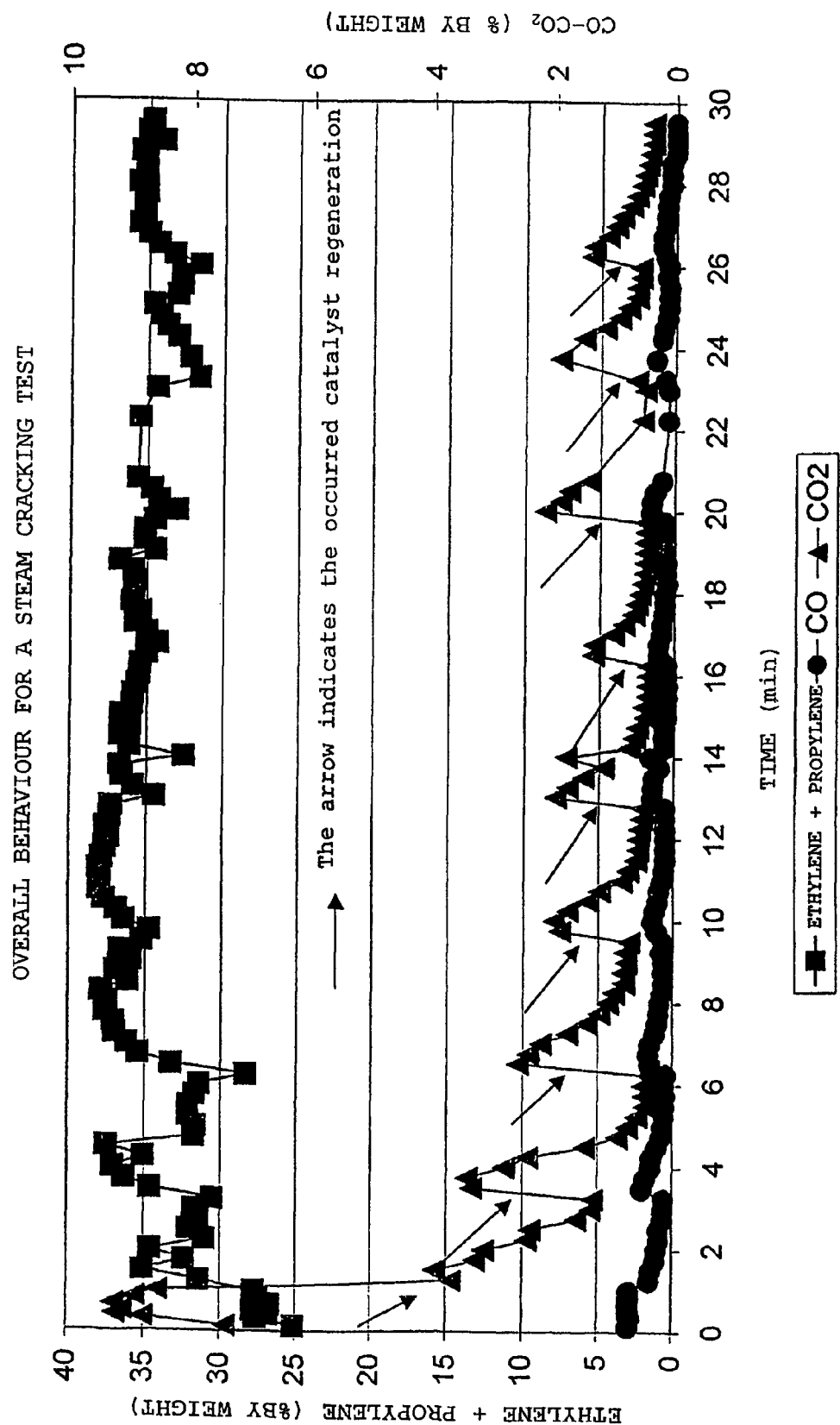

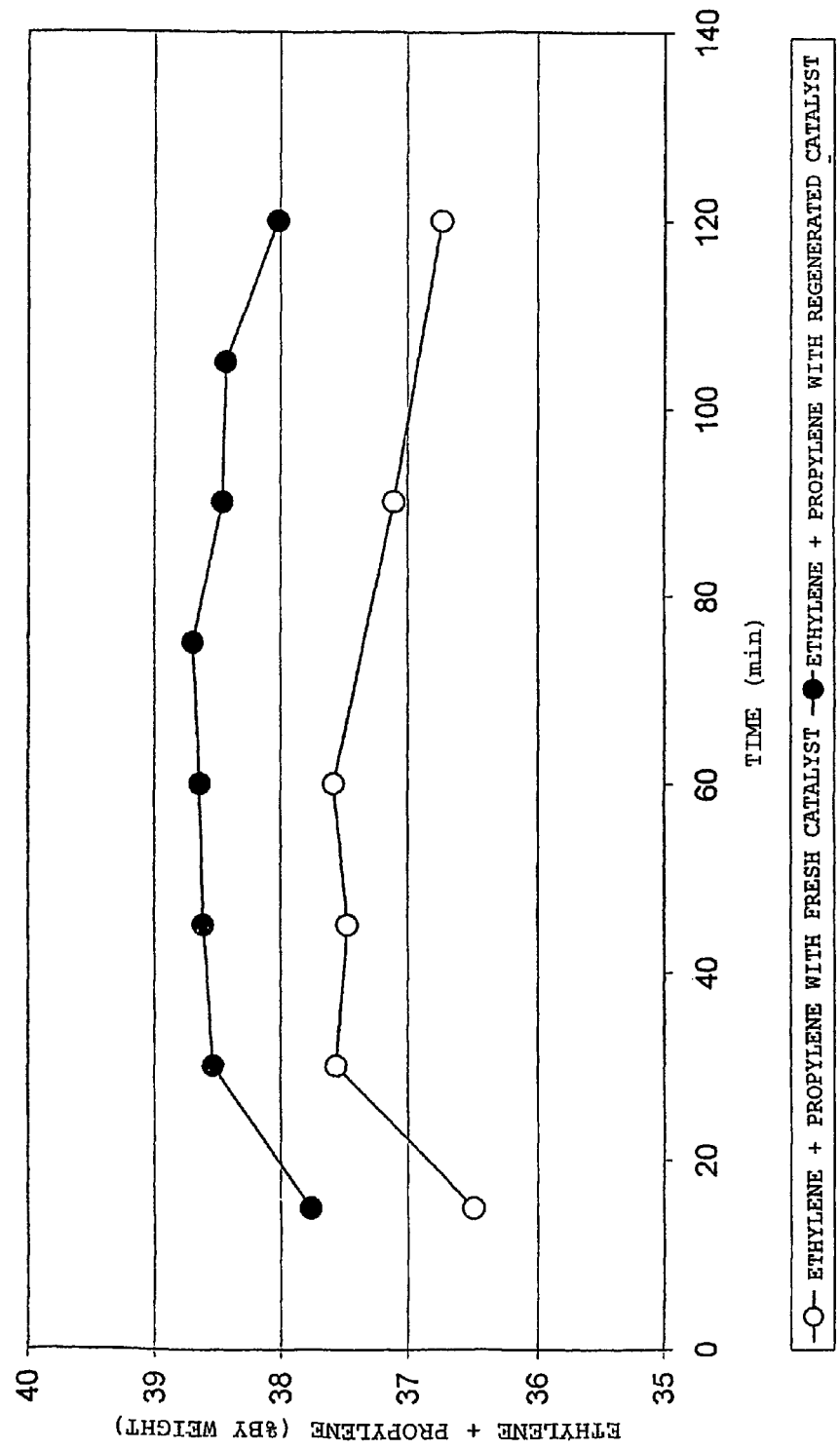

PROCESS FOR THE REGENERATION OF CATALYSTS FOR STEAM CRACKING

Figure 1:
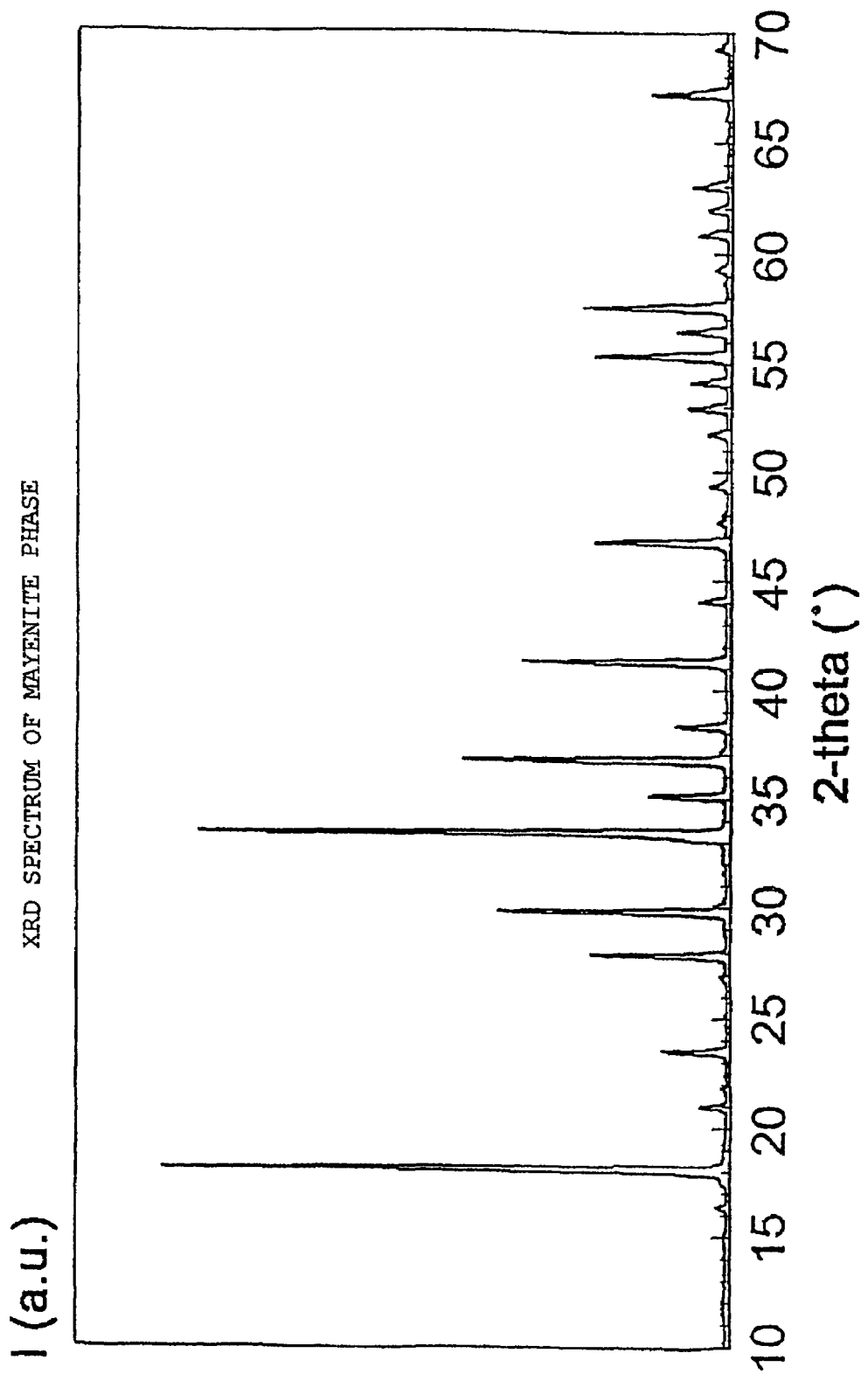

The present invention relates to a process for the regeneration of catalysts for steam cracking.

One of the main problems associated with heterogeneous catalysis processes is the loss of catalytic activity during the reaction, i.e. deactivation. This process can be either of a chemical or physical nature and takes place simultaneously with the main reaction. For catalytic reactions involving hydrocarbon charges and in particular in cracking reactions, side reactions occur on the surface of the catalytic particles which cause the formation of carbonaceous deposits, usually indicated as coke. These residues tend to physically cover the active surface and can deactivate the catalyst both by directly covering the active sites and by obstructing the pores which allow access to the active sites themselves.

The regeneration of catalysts used in cracking processes or conversion of hydrocarbon charges is therefore an extremely important step in many refinery processes and in the petrochemical field. The regeneration of catalysts in this type of process consists in eliminating the coke which is formed on the surface of the catalyst. The coke, as already mentioned, covers the surface and obstructs the pores of the structure of the catalytic particle, thus preventing access of the molecules of the reagents in gaseous and/or liquid phase to the active sites situated on the surface of the catalytic solid. In this way, the catalyst cannot express its properties in the reagent system and must therefore be substituted or, as happens in most cases, regenerated.

The regeneration normally takes place by combustion of the coke deposited on the catalytic particles. The combustion must be effected however under controlled conditions, with particular respect to the temperature and gaseous atmosphere. Under conditions which are too drastic or however unsuitable, harmful and irreversible modifications can be caused to the structure of the catalyst, which can thus lose its properties. The regeneration procedures (duration, temperature, pressure and atmosphere conditions) can therefore vary depending on the process and type of catalyst used and must be studied and set up in detail. Various parameters such as the duration of the catalytic activity in each reaction cycle and the catalyst life, which have a significant impact on the whole process, can in fact depend on the greater or lesser efficiency of the regeneration.

On an industrial scale, the regeneration of catalysts is a practice which is commonly studied and used. In some processes, such as "Fluid Catalytic Cracking" (FCC), regeneration takes place in continuous in the regenerator of the circulating fluid bed reactor. In others, the exhausted catalyst is discharged from the reactor, externally regenerated and recharged to the reactor. In some cases, a so-called "swing reactor" system is used in which there are two or more reactors in parallel. The main reaction is carried out in the first reactor; when the catalyst is deactivated, the reagents are sent to a second reactor containing fresh catalyst, whereas the catalyst in the first reactor is regenerated. In each reactor there are therefore alternating reaction cycles and regeneration; a continuous process is thus obtained with batch regeneration of the catalyst in situ, i.e. while the reaction takes place in one reactor, the regeneration of the exhausted catalyst is effected in a second or more reactors.

In previous patent applications (IT-MI99 A002616 and IT-MI99 A002615) the use of catalysts is claimed in a cracking process in the presence of vapour (steam cracking) for the production of light olefins. Steam cracking is a petrochemical process of great importance; its main products are ethylene and propylene, i.e. two of the major "elements" of petrochemistry, compounds which are used in numerous processes for the production of a large quantity of intermediates and chemical products. Steam cracking uses hydrocarbon charges with a high paraffinic content such as ethane, propane, GPL, naphtha, light gas oils. The charges are thermally converted, at a high temperature and in the presence of vapour, into prevalently olefinic products. During the process there is the formation of coke which is deposited on the inner walls of the coils of the cracking ovens. When the thickness of the layer of coke becomes too great, the plant must be stopped to remove the carbonaceous deposits. The heavier the starting charge, the more rapid will be the deposition of coke. Excessively heavy charges and with a high content of aromatics cannot therefore be treated in conventional plants for economic (necessity of frequent plant stoppages) or technological (impossibility of running conventional ovens) reasons.

In recent years, in order to increase the economic validity and flexibility of cracking processes, attempts have been made to use charges of a worse quality than those normally used. Partial modifications to current steam cracking ovens have only provided slight improvements in this sense; important advantages with respect to the possible use of heavy charges can only be obtained however with the introduction into the process of a catalyst which allows a reduction in the reaction temperature and the minimum formation of coke. The use of a specific catalyst in steam cracking therefore enables charges to be exploited, which could not be fed to conventional cracking ovens. During the reaction, there is still the formation of coke on the surface of the catalyst. The catalyst remains active for a few hours, after which it must be regenerated.

The regeneration, as already specified, is commonly effected with air at a high temperature; the process must take place under controlled conditions, otherwise, due to the exothermicity of the combustion reaction of the coke, phenomena may occur such as sintering, agglomeration, loss of active phase, etc., which cause permanent deactivation of the catalytic material. Even operating under controlled conditions, local overheating of the catalytic particles may still occur, causing modifications of the material and a reduction in the life of the catalyst.

We have found that catalysts containing crystalline calcium aluminates can be regenerated by means of treatment with vapour at a high temperature, in the absence of air or another oxidizing gas, continuing to express their properties.

Furthermore, it has been surprisingly observed how the regeneration process we have set up allows higher performances of the regenerated catalyst to be obtained with respect to those of fresh catalyst. In steam cracking reactions with regenerated catalyst, in fact, increased yields to ethylene+propylene have been obtained, with reduced yields to carbon oxides with respect to reactions carried out with fresh catalyst. Fresh catalyst evidently has an excessive activity for cracking and leads to the formation of various by-products, with a loss in selectivity to olefins. The catalyst after regeneration, on the other hand, has a milder activity; regeneration allows a more controlled cracking reaction with better yields to the desired products and a greater duration of the activity in the cracking reaction.

The process, object of the present invention, for the regeneration of exhausted catalysts containing one or more calcium aluminates, for steam cracking reactions, comprises treating said exhausted catalysts in a stream of water vapour at a temperature ranging from 700 to 950° C., preferably from 720 to 850° C., and at a pressure ranging from 0.5 to 2 atm.

The regeneration is preferably carried out for a time ranging from 5 to 10 hours with a vapour feeding ranging from 5 to 15 $gh^{-1} g_{cat}^{-1}$.

The regeneration can be effected in the same reactor in which the steam cracking reaction takes place. When the catalyst has lost its activity, the stream of hydrocarbon reagent is interrupted and the feeding of water vapour is started, under suitable conditions for the regeneration. The vapour is fed onto the catalytic bed for several hours, until the carbonaceous deposits have been eliminated.

Among the advantages of this procedure, it can be noted that the regeneration is effected in the absence of air; there is consequently no combustion and the main reactions involved are endothermic. This allows the temperature to be kept under control and also avoids excessive overheating of the catalyst particles. As mentioned above, the performances of the regenerated catalyst are higher than those of fresh catalyst and are maintained for numerous reaction-regeneration cycles. The type of procedure and duration of the reaction and regeneration cycles are compatible with a process which comprises two or more reactors operating in parallel, alternatingly in reaction and regeneration.

The calcium aluminate of which the exhausted catalysts to be regenerated with the process according to the invention, are formed, can be pure mayenite, claimed in patent application IT-MI99A002616, having the general formula

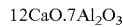

having, in its calcined form, an X-ray diffraction spectrum, registered by means of a vertical goniometer equipped with an electronic impulse count system and using CuKα radiation (λ=1.54178 Å), containing the main reflections indicated in Table I (wherein d indicates the interplanar distance) and in FIG. 1.

The catalyst consisting of said pure mayenite allows better results to be obtained in terms of yield to light olefins in the field of steam cracking reactions of naphtha with respect to mixtures containing mayenite and other calcium-aluminates, either pure or mixed with each other.

The process for the preparation of pure mayenite described above comprises the following steps:
  dissolution of salts containing calcium and aluminum with water;
  complexing of the dissolved salts by means of polyfunctional organic hydroxy-acids;
  drying of the solution resulting from the complexing so as to obtain a solid precursor product;
  calcination of the solid precursor product at a temperature ranging from 1300 to 1400° C., preferably from 1330 to 1370° C., for at least 2 hours, preferably at least 5 hours.

The polyfunctional organic hydroxy-acids can be selected from citric acid, maleic acid, tartaric acid, glycolic acid and lactic acid: citric acid is preferred.

The salts containing calcium are preferably selected from calcium acetate and calcium nitrate.

Aluminum nitrate is the preferred salt containing aluminum.

It is advisable for the preparation process to be carried out with a molar ratio polyfunctional hydroxy-acids/salts containing calcium and alumina ranging from 1.5 to 1.

The exhausted catalysts to be regenerated with the process according to the invention can consist of crystalline calcium aluminates having a molar ratio $CaO/Al_2O_3$ ranging from 1/6 to 3 and molybdenum and/or vanadium oxides, wherein the molybdenum oxide, expressed as $MoO_3$, or vanadium oxide, expressed as $V_2O_5$, or the sum of said two oxides is in a quantity ranging from 0.5 to 10%, preferably from 0.8 to 5% by weight, as claimed in patent application IT-MI99A002615 cited above.

The activity of the calcium-aluminate compounds in the steam cracking reaction is increased by the addition of transition metals such as molybdenum and vanadium. These elements, in fact, added in the form of oxides to the basic catalyst, allow a further increase to be obtained, in the yield to the main products desired, i.e. ethylene and propylene. The negative effects on the formation of by-products such as coke and carbon oxides are limited; these by-products, in fact, in tests with virgin naphtha, do not exceed 1% by weight of yield with respect to the starting charge, even in the presence of catalyst modified with Mo or V.

The process for the preparation of the catalyst described above comprises the following steps:
  dissolution of a salt containing molybdenum or vanadium in an appropriate solvent;
  impregnation of the calcium aluminate present in granular form, by the addition of said aluminate to the solution of the molybdenum or vanadium salt;
  elimination of the solvent;
  drying at a temperature ranging from 100 to 150° C. of the solid precursor product;
  calcination of the solid precursor product at a temperature ranging from 500 to 650° C. for at least 4 hours.

The solvent depends on the salt selected: it is preferably selected from water, alcohol, ether, acetone; water is more preferably used for dissolving the molybdenum salt and ethanol for the vanadium salt.

The crystalline calcium aluminates forming the catalyst should be selected from those having a molar ratio $CaO/Al_2O_3$ ranging from 1/6 to 3, more preferably equal to 12/7 or equal to 3.

The crystalline calcium aluminate having a molar ratio $CaO/Al_2O_3$ equal to 12/7 can be the same pure mayenite described above, claimed in patent application IT-MI99A002616.

A further object of the present invention relates to the integrated light olefin+regeneration process.

The process for the production of light olefins by the steam cracking reaction of hydrocarbon charges selected from naphtha, kerosene, atmospheric gas oil, vacuum gas oil, ethane and GPL, alone or mixed with each other, consists in:
a) reacting said hydrocarbon charges with catalysts containing one or more calcium aluminates, in a reactor operating at a temperature ranging from 670 to 850° C., preferably from 720 to 800° C., at a pressure ranging from 1.1 to 1.8 absolute Atm., with a vapour/charge ratio ranging from 0.1 to 1.5 w/w, preferably from 0.2 to 1, and for a contact time ranging from 0.05 to 0.2 sec.;
b) regenerating said catalysts by means of a regeneration process comprising treating said exhausted catalysts in a stream of water vapour at a temperature ranging from 720 to 850° C., at a pressure ranging from 0.5 to 2 atm., for a time preferably ranging from 5 to 10 hours and with a vapour feeding preferably ranging from 5 to 15 $gh^{-1} g_{cat}^{-1}$.

Some examples are provided for a better understanding of the present invention but should not be considered as limiting the scope of the invention itself.

EXAMPLES

First of all, some examples are provided of the preparation of the catalysts described in patent applications IT-MI99A002616 and IT-MI99A002615 for which the regeneration procedure according to the invention is particularly effective.

Example 1

Preparation of the Catalyst Consisting of Pure Mayenite (Already Described in Example 1 of Patent Application IT-M199A002616).

A synthesis method in homogeneous phase was used.

This method comprises the use of citric acid or polyfunctional hydroxy-acids with the function of complexing metal salts in aqueous solution. After dehydrating the aqueous solution, an amorphous precursor solid is obtained, which, after high temperature thermal treatment, produces the desired product.

The main advantages of this technique are:

homogeneous mixing on an atomic level good stoichiometric control production of mixed oxides using commercial chemical products short process times.

A solution of aluminum nitrate, 378.2 g of $Al(NO_3)_3 \cdot 9H_2O$ (1.008 moles in 470 g of water was first added to a solution of calcium acetate, obtained by dissolving 152.2 g of $(CH_3COO)_2Ca \cdot H_2O$ (0.864 moles) at room temperature in 450 g of $H_2O$, followed by a solution of citric acid: 393.1 g (1.872 moles) in 375 g of water. The homogeneous solution obtained was dried by means of a spray-dryer. The desired product $12CaO \cdot 7Al_2O_3$ (Mayenite) was obtained in pure form after calcination at 1350° C. for 5 h.

In order to obtain a catalyst formed by pelletizing, a lubricating agent was added (2 wt % of stearic acid); after pelletizing the catalyst was subjected to a further calcination step.

The composition of the catalyst obtained was verified by means of X-ray diffractometry which revealed the presence of the sole pure $12CaO \cdot 7Al_2O_3$ phase.

(See Table I and FIG. 1 mentioned above).

Example 2

Preparation: Doped Mayenite $(12CaO \cdot 7Al_2O_3)+(2\% \ MoO_3)$ (Already Described in Example 2 of Patent Application IT-MI99A002615).

0.86 g of ammonium tetrahydrate heptamolybdate (0.0049 moles) in 100 g of water were charged into a 250 cc flask. 35 g of granulated mayenite (20-40 mesh) were added to the solution. After 2 hr, the product was dried and then calcined at 550° C. for 5 hr.

Figure 2:
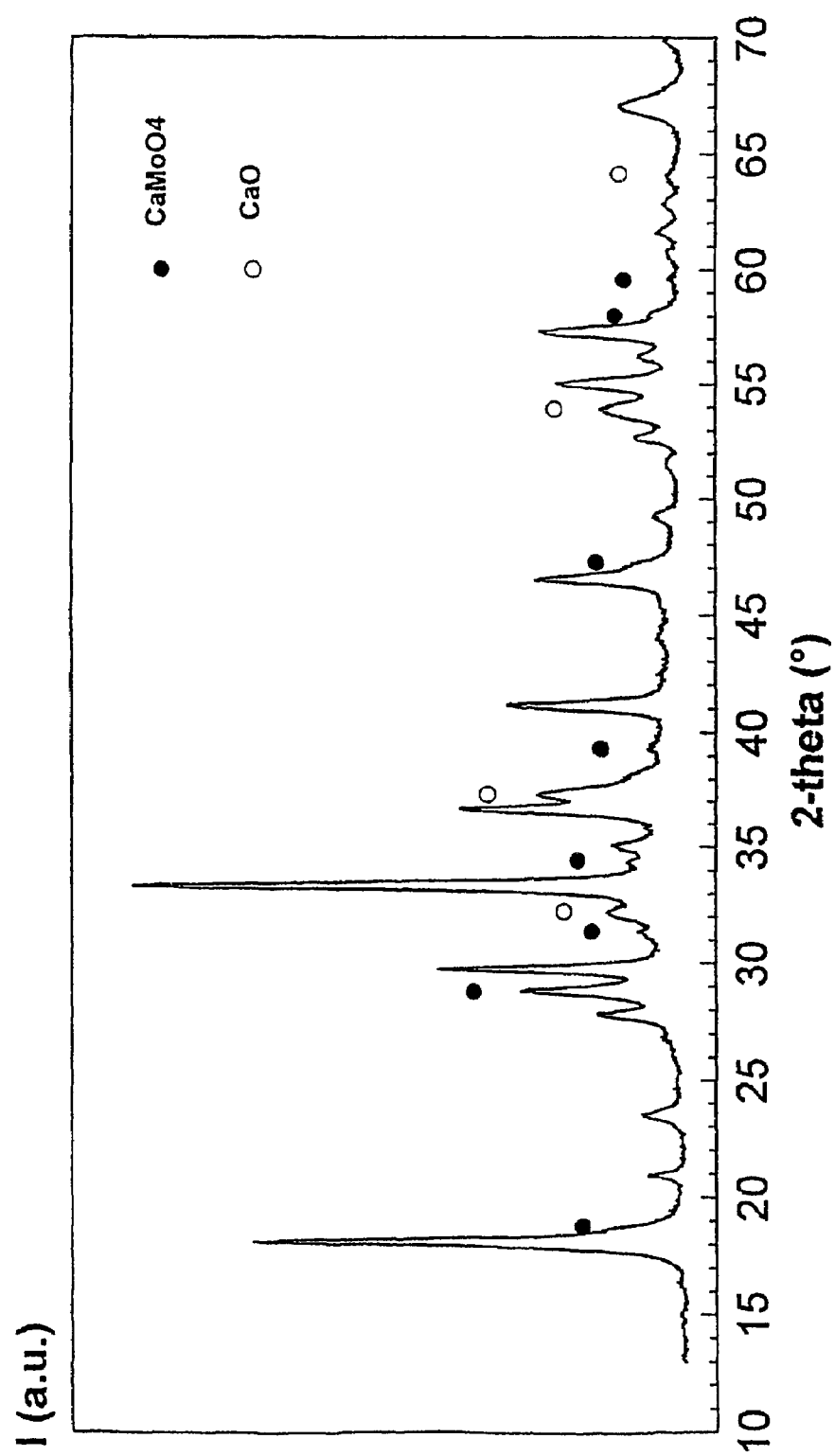

The composition of the catalyst obtained was verified by means of X-ray diffractometry (Table II and FIG. 2) from which it can be seen that the crystalline structure of the mayenite is not altered by the addition of molybdenum.

Small quantities of CaO may be formed, which however have no influence on the catalytic activity.

Example 3

Preparation: Doped Mayenite $(12CaO \cdot 7Al_2O_3)+(2\% \ V_2O_5)$ (Already Described in Example 3 of Patent Application IT-MI99A002615).

2.68 g of vanadium(III)acetylacetonate (0.0077 moles), in 75 g of ethanol were charged into a 250 cc flask. 35 g of granulated mayenite (20-40 mesh) were added to the solution. After 2 hr, the product was dried and then calcined at 550° C. for 5 hr.

Example 4

Steam Cracking Reaction Effected in a Laboratory Plant with a Fixed Bed Reactor Having a ½ Inch Diameter.

Operating conditions for the steam cracking:

Charge=HVGO (heavy vacuum gas oil, density at 23° C.=0.8955 g/cm³)

T=750° C.

$H_2O$/Charge=0.8 w/w

Catalyst: mixture of calcium-aluminates (15% w $3CaO \cdot Al_2O_3$; 70% w $5CaO \cdot 3Al_2O_3$; 15% w $CaO \cdot Al_2O_3$)

Test time=1 hour both with fresh catalyst and with regenerated catalyst

Operating conditions for the regeneration of the catalyst:

T=800° C.

Vapour feeding: 9 $g/h \cdot g_{cat}^{-1}$

Time: 6 hours

Figure 3:
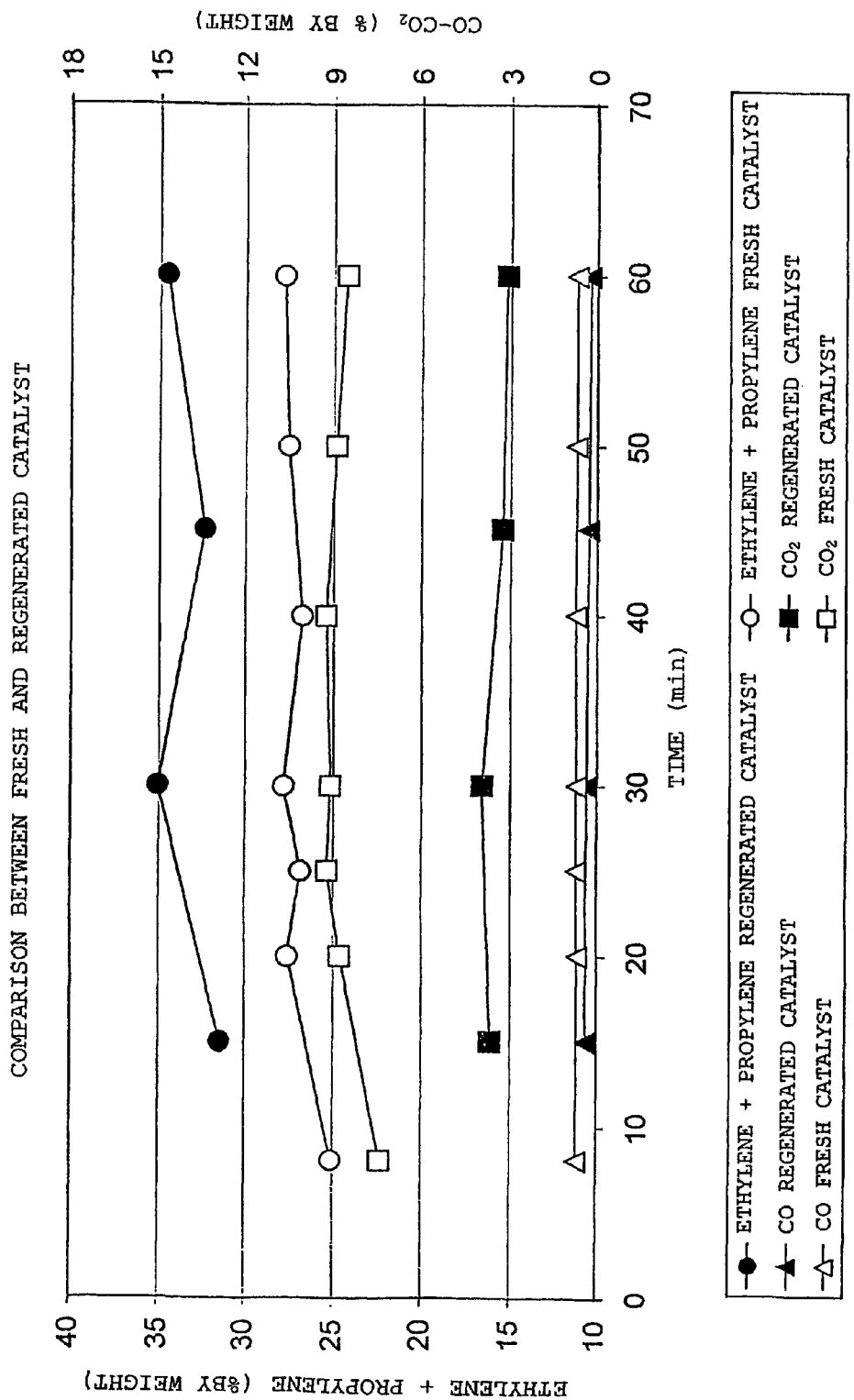

FIG. 3 illustrates the performances of fresh catalyst and after regeneration with vapour.

It can be observed how the quantity of ethylene+propylene is always greater in the test carried out with regenerated catalyst, on the contrary the quantity of $CO_2$ produced therewith is much lower than that generated in the test with fresh catalyst. The quantity of CO, even if to a lesser extent, also decreases in the test with regenerated catalyst.

Example 5

Steam Cracking Reaction Effected in a Laboratory Plant with a Fixed Bed Reactor Having a ½ Inch Diameter.

Operating conditions for the steam cracking:

Charge=HVGO

T=750° C.

$H_2O$/Charge=0.8 w/w

Catalyst: mixture of calcium-aluminates (15% w $3CaO \cdot Al_2O_3$; 70% w $5CaO \cdot 3Al_2O_3$; 15% w $CaO \cdot Al_2O_3$)

Test time=1 hour with fresh catalyst; 3.5 hours with regenerated catalyst

Operating conditions for the regeneration of the catalyst:

T=800° C.

Vapour feeding: 9 $g/h \cdot g_{cat}^{-1}$

Time: 6 hours

FIG. 4 illustrates the difference between the fresh catalyst and used catalyst after 4 regeneration cycles with vapour.

It can be observed how the quantity of ethylene+propylene is greater in the test carried out with the regenerated catalyst, and is also slightly higher with respect to that obtained after the first regeneration.

The $CO_2$ produced continues to decrease both with respect to the number of regenerations and also with respect to the duration time of the test; the same behaviour is noted in the production of CO.

Example 6

Steam Cracking Reaction Effected in a Laboratory Plant with a Fixed Bed Reactor Having a ½ Inch Diameter.

Operating conditions for the steam cracking:

Charge=HVGO

T=750° C.
H$_2$O/Charge=0.8 w/w
Catalyst: mixture of calcium-aluminates (15% w 3CaO.Al$_2$O$_3$; 60% w 5CaO.3Al$_2$O$_3$; 20% w 12CaO.7Al$_2$O$_3$; 5% w CaO.Al$_2$O$_3$)
Test time=1 hour with fresh catalyst; from 2 to 3.5 hours with regenerated catalyst Operating conditions for the regeneration of the catalyst:
T=800° C.
Vapour feeding: 9 g/h·g$_{cat}^{-1}$
Time: 6 hours FIG. 5 illustrates the production trend of ethylene+propylene, CO$_2$ and CO. This graph was obtained by summing the test time without considering the regeneration time; the data of the first hour refer to fresh catalyst (first 6 points), the rest to the regenerated catalyst (6 times in all).

It can be observed that with an increase in the number of regenerations, the production of ethylene+propylene seems to become stabilized, whereas contemporaneously, the quantity of CO$_2$ tends to progressively decrease. (it can be noted that the maximum quantity of CO$_2$ is always present at the beginning of the single tests and its value progressively decreases with an increase in the number of regenerations).

The performances of the regenerated catalyst are better than those of fresh catalyst and are maintained after various reaction-regeneration cycles.

Example 7

Steam Cracking Reaction Effected in a Laboratory Plant with a Fixed Bed Reactor Having a ½ Inch Diameter.

Operating conditions for the steam cracking:
Charge=HVGO
T=750° C.
H$_2$O/Charge=0.8 w/w
Catalyst: pure mayenite (Ca$_{12}$Al$_{14}$O$_{33}$)
Test time=2 hours both for the fresh catalyst and for the regenerated catalyst Operating conditions for the regeneration of the catalyst:
T=800° C.
Vapour feeding: 9 g/h·g$_{cat}^{-1}$
Time: 6 hours FIG. 6 compares the production of ethylene+propylene with fresh catalyst and regenerated catalyst. The quantities of CO and CO$_2$ are almost zero and are therefore not indicated.

The performances of the regenerated catalyst are better than those of fresh catalyst.

TABLE I

X-ray diffraction spectrum of the pure Mayenite phase

| 2θ (CuKα) (°) | d (Å) |
|---|---|
| 18.18 | 4.88 |
| 21.02 | 4.22 |
| 23.52 | 3.78 |
| 27.89 | 3.196 |
| 29.87 | 2.989 |
| 33.48 | 2.675 |
| 35.17 | 2.550 |
| 36.77 | 2.442 |
| 38.33 | 2.347 |
| 41.31 | 2.184 |
| 44.10 | 2.052 |
| 46.76 | 1.941 |
| 49.30 | 1.847 |
| 51.76 | 1.765 |
| 52.96 | 1.728 |
| 54.14 | 1.693 |
| 55.30 | 1.660 |
| 56.44 | 1.629 |
| 57.56 | 1.600 |
| 60.87 | 1.521 |
| 61.95 | 1.497 |
| 62.98 | 1.475 |
| 67.19 | 1.392 |
| 69.23 | 1.356 |

TABLE II

X-ray diffraction spectrum of the sample consisting of Mayenite Ca$_{12}$Al$_{14}$O$_{33}$ and Powellite CaMoO$_4$

| 2θ (CuKα) (°) | d (Å) Mayenite | d (Å) Powellite |
|---|---|---|
| 18.18 | 4.88 | |
| 18.68 | | 4.75 |
| 21.02 | 4.22 | |
| 23.52 | 3.78 | |
| 27.89 | 3.196 | |
| 28.80 | | 3.097 |
| 29.87 | 2.989 | |
| 31.33 | | 2.853 |
| 33.48 | 2.675 | |
| 34.34 | | 2.609 |
| 35.17 | 2.550 | |
| 36.77 | 2.442 | |
| 38.33 | 2.347 | |
| 39.38 | | 2.286 |
| 39.95 | | 2.255 |
| 41.31 | 2.184 | |
| 44.10 | 2.052 | |
| 46.76 | 1.941 | |
| 47.11 | | 1.927 |
| 49.30 | 1.847 | |
| 51.76 | 1.765 | |
| 52.96 | 1.728 | |
| 54.14 | 1.693 | |
| 55.30 | 1.660 | |
| 56.44 | 1.629 | |
| 57.56 | 1.600 | |
| 58.05 | | 1.588 |
| 59.59 | | 1.550 |
| 60.87 | 1.521 | |
| 61.95 | 1.497 | |
| 62.98 | 1.475 | |
| 67.19 | 1.392 | |
| 69.23 | 1.356 | |

The invention claimed is:

1. A process for the regeneration of exhausted catalysts containing one or more calcium aluminates, for steam cracking reactions, consisting of treating said exhausted catalysts in a stream of water vapour at a temperature ranging from 700 to 950° C., and at a pressure ranging from 0.5 to 2 atm.

2. The process according to claim 1, wherein vapour feeding ranges from 5 to 15 gh$^{-1}$ g$_{cat}^{-1}$.

3. The process according to claim 1, wherein the regeneration takes place in fixed bed reactors in parallel, functioning alternatingly in steam cracking reaction and in regeneration (swing reactors).

4. The process according to claim 1, wherein the calcium aluminate is pure mayenite having the general formula 12CaO.7 Al$_2$ O$_3$ having an X-ray diffraction spectrum as indicated in Table 1

TABLE I

| 2θ (CuKα) (°) | d (Å) |
|---|---|
| 18.18 | 4.88 |
| 21.02 | 4.22 |
| 23.52 | 3.78 |
| 27.89 | 3.196 |
| 29.87 | 2.989 |
| 33.48 | 2.675 |
| 35.17 | 2.550 |
| 36.77 | 2.442 |
| 38.33 | 2.347 |
| 41.31 | 2.184 |
| 44.10 | 2.052 |
| 46.76 | 1.941 |
| 49.30 | 1.847 |
| 51.76 | 1.765 |
| 52.96 | 1.728 |
| 54.14 | 1.693 |
| 55.30 | 1.660 |
| 56.44 | 1.629 |
| 57.56 | 1.600 |
| 60.87 | 1.521 |
| 61.95 | 1.497 |
| 62.98 | 1.475 |
| 67.19 | 1.392 |
| 69.23 | 1.356. |

5. The process according to claim 1, wherein the exhausted catalysts consist of one or more crystalline calcium aluminates having a molar ratio $CaO/Al_2O_3$ ranging from 1:6 to 3:1, and of molybdenum and/or vanadium oxides wherein the molybdenum oxide, expressed as $MoO_3$, or vanadium oxide expressed as $V_2O_5$, or the sum of said two oxides is in a quantity ranging from 0.5 to 10% by weight.

6. The process according to claim 5, wherein the molybdenum oxide, expressed as $MoO_3$, or vanadium oxide expressed as $V_2O_5$, or the sum of said two oxides is in a quantity ranging from 0.8 to 5% by weight.

7. The process according to claim 5, wherein the crystalline calcium aluminate has a molar ratio $CaO/Al_2O_3$ equal to 12:7 or equal to 3:1.

8. The process according to claim 5, wherein the crystalline calcium aluminate has a molar ratio $CaO/Al_2O_3$ equal to 12:7 and is pure mayenite.

9. A process for the production of light olefins by the steam cracking reaction of hydrocarbon charges selected from naphtha, kerosene, atmospheric gas oil, vacuum gas oil, ethane and GPL, alone or mixed with each other, comprising:
   a) reacting said hydrocarbon charges with catalysts containing one or more calcium aluminates, in a reactor operating at a temperature ranging from 670 to 850° C., at a pressure ranging from 1.1 to 1.8 absolute Atm., with a vapour/charge ratio of 0.1 to 1.5 w/w and for a contact time ranging from 0.05 to 0.2 sec;
   b) regenerating said catalysts by means of a regeneration process according to claim 1.

10. The process according to claim 6, wherein the crystalline calcium aluminate has a molar ratio $CaO/Al_2O_3$ equal to 12:7 or equal to 3:1.

11. The process according to claim 7, wherein the crystalline calcium aluminate has a molar ratio $CaO/Al_2O_3$ equal to 12:7 and is pure mayenite.

12. A process for the production of light olefins by the steam cracking reaction of hydrocarbon charges selected from naphtha, kerosene, atmospheric gas oil, vacuum gas oil, ethane and GPL, alone or mixed with each other, comprising:
   a) reacting said hydrocarbon charges with catalysts containing one or more calcium aluminates, in a reactor operating at a temperature ranging from 670 to 850° C., at a pressure ranging from 1.1 to 1.8 absolute Atm., with a vapour/charge ratio of 0.1 to 1.5 w/w and for a contact time ranging from 0.05 to 0.2 sec.
   b) regenerating said catalysts by means of a regeneration process according to claim 2.

13. A process for the production of light olefins by the steam cracking reaction of hydrocarbon charges selected from naphtha, kerosene, atmospheric gas oil, vacuum gas oil, ethane and GPL, alone or mixed with each other, comprising:
   a) reacting said hydrocarbon charges with catalysts containing one or more calcium aluminates, in a reactor operating at a temperature ranging from 670 to 850° C., at a pressure ranging from 1.1 to 1.8 absolute Atm., with a vapour/charge ratio of 0.1 to 1.5 w/w and for a contact time ranging from 0.05 to 0.2 sec.
   b) regenerating said catalysts by means of a regeneration process according to claim 3.

* * * * *